UNITED STATES PATENT OFFICE.

WILLIAM D. RICHARDSON, OF CHICAGO, ILLINOIS, ASSIGNOR TO SWIFT AND COMPANY, OF CHICAGO, ILLINOIS, A CORPORATION OF ILLINOIS.

PROCESS FOR MANUFACTURING FERTILIZERS.

1,232,452. Specification of Letters Patent. Patented July 3, 1917.

No Drawing. Application filed August 28, 1915. Serial No. 47,727.

*To all whom it may concern:*

Be it known that I, WILLIAM D. RICHARDSON, a citizen of the United States of America, and a resident of Chicago, county of Cook, and State of Illinois, have invented certain new and useful Improvements in Processes for Manufacturing Fertilizers, of which the following is a specification.

My process has for its purpose the conversion of the insoluble potash contained in silicate rocks, such as feldspar, mica, leucite, etc., into potash soluble in water and available for use in agriculture and the arts. To accomplish this purpose I make use of the heat of reaction and of the chemicals used in the manufacture of acid phosphate from phosphate rock or apatite. In order to bring about this result I add, to fluorid containing phosphate rock or apatite, in the mixer, a certain proportion of a silicate rock containing potash, and then proceed with the acidulation in the customary way. In the reaction, a certain amount of hydrofluoric acid is liberated from the fluorid present in the fluorid containing phosphate rock or apatite, and this hydrofluoric acid acts on the insoluble potash of the silicate rock in such a way as to cause it to become water soluble. The acid used in the manufacture and the heat of reaction also contribute to this result so that finally a product is obtained which contains a certain amount of water soluble potash. The following example illustrates my process.

One thousand pounds of ground phosphate rock are placed in an acid phosphate mixer of suitable design. From two hundred to five hundred pounds of ground feldspar, leucite, mica, or other potash bearing silicate rock are now added and mixed with the phosphate rock. Next one thousand pounds of fifty-one degree Baumé sulfuric acid are run in and the whole thoroughly agitated and mixed. The mixture is then conveyed to a closed chamber or den or simply dumped in a pile.

While in my preferred practice I make use of the above proportions, the amounts of the various ingredients can be varied widely without departing from the essential principles involved, and I do not wish to limit myself to the proportions stated above since wide latitude in this respect will bring about excellent results.

Having now described my process I claim and desire to secure by Letters Patent:

1. The process of rendering water soluble the insoluble potash in silicate rock, which consists in mixing together a material containing calcium phosphate and a fluorid, a potash bearing silicate rock, and an acid capable of decomposing fluorid.

2. The process of rendering water soluble the insoluble potash in silicate rock, which consists in mixing together a fluorid containing phosphate rock, feldspar, and an acid capable of decomposing fluorid.

3. The process of rendering water soluble the insoluble potash in silicate rock, which consists in mixing together fluoridic material containing calcium phosphate, a potash bearing silicate rock, and an acid capable of decomposing fluorid, and conveying the mixture to a den or pile to complete the reaction, and drying same.

Signed at Chicago this 25th day of August 1915.

WILLIAM D. RICHARDSON.